(12) United States Patent
Harvey

(10) Patent No.: US 9,820,491 B1
(45) Date of Patent: Nov. 21, 2017

(54) CATFISH BAIT

(71) Applicant: James L. Harvey, Sidney, IA (US)

(72) Inventor: James L. Harvey, Sidney, IA (US)

(*) Notice: Subject to any disclaimer, the term of this patent is extended or adjusted under 35 U.S.C. 154(b) by 168 days.

(21) Appl. No.: 14/750,661

(22) Filed: Jun. 25, 2015

Related U.S. Application Data

(60) Provisional application No. 62/046,408, filed on Sep. 5, 2014.

(51) Int. Cl.
*A01N 65/10* (2009.01)
*A01N 25/34* (2006.01)
*A01N 65/08* (2009.01)
*A01K 85/01* (2006.01)
*A01K 97/04* (2006.01)

(52) U.S. Cl.
CPC ............. *A01N 65/10* (2013.01); *A01K 85/01* (2013.01); *A01K 97/045* (2013.01); *A01N 25/34* (2013.01); *A01N 65/08* (2013.01)

(58) Field of Classification Search
CPC ........ A01N 65/10; A01N 25/34; A01N 65/08; A01K 85/01; A01K 97/045
See application file for complete search history.

(56) References Cited

U.S. PATENT DOCUMENTS

| | | |
|---|---|---|
| 2,799,115 A | 7/1957 | Reus |
| 4,890,411 A | 1/1990 | Buccilli et al. |
| 4,962,609 A | 10/1990 | Walker |
| 6,079,146 A | 6/2000 | Larsen |
| 6,789,349 B1 | 9/2004 | Stone |
| 7,803,360 B2 | 9/2010 | Hanson et al. |
| 2007/0017145 A1 | 1/2007 | Burt et al. |
| 2010/0281755 A1 | 11/2010 | Armour |

*Primary Examiner* — Trevor Love
(74) *Attorney, Agent, or Firm* — Robert C. Montgomery; Montgomery Patent & Design LP.

(57) ABSTRACT

A deformable, dissolvable substance having a base material of gum paste capable of being deformed around a fishing hook. Other ingredients include powdered sugar, corn syrup, corn starch, butter, scent, and color. The scent is dispersed as the substance dissolves in water, thus attracting any fish finding the scent palatable.

16 Claims, 3 Drawing Sheets

CATFISH BAIT

RELATED APPLICATIONS

The present invention was first described in and claims the benefit of U.S. Provisional Application No. 62/046,408 filed Sep. 5, 2014, the entire disclosures of which are incorporated herein by reference.

FIELD OF THE INVENTION

The present invention relates generally to a deformable, dissolvable substance that disperses a fish attracting scent.

BACKGROUND OF THE INVENTION

The technology used by anglers to catch fish has become increasingly complex in nature. Fishermen no longer solely rely upon the traditional hook and worm approach to attract and catch their prize. Rather, a broad range of products have hit the market, all designed to aid the fisherman to catch a fish, to catch more fish and to do so quickly.

One (1) of the more popular styles of products constitutes those of various liquids that are applied to lures in an effort to enhance the attractiveness of the lure to a given species of fish. While such products have generated some success, they do suffer from the fact that insertion in water tends to quickly wash off the attractant. As a result, this requires the fisherman to frequently remove the lure from the water and re-apply the liquid. This process of continual re-application yields a reduction in the period of time that fishing is actually taking place and may scare fish away due to the noise of frequent lure retrieval and re-casting.

Accordingly, there is a need for a means by which the advantages of using liquid based chemical style attractants to lure fish can be enhanced. The use of the bait as described in the instant application provides fishermen an increased chance of not only attracting catfish but allows them an increased probability of hooking and landing them as well.

SUMMARY OF THE INVENTION

The inventor has recognized the aforementioned inherent problems and lack in the art and observed that there is a need for a catfish bait.

It is therefore an object of the invention to provide a fishing lure, comprising a tubular device, a bait composition wrapped around the tubular device and a strip of wax paper. The strip of wax paper removably covers an exposed surface of the bait composition. The bait composition may also be capable of being molded. The bait composition comprises a dissolvable substance having an attractant. The bait composition comprises gum paste, powdered sugar, corn syrup, butter, water, a scent, and a colorant.

The bait composition further comprises for and a half teaspoons (4½ tsp) of gum paste, one and a quarter cups (1¼ c) of powdered sugar, one-third cup (⅓ c) of corn syrup, two teaspoons (2 tsp) of butter, one-quarter cup (¼ c) of water, three (3) drops of scent, and two-tenths of a cubic centimeter (0.2 cc) of color. The scent comprises an anise odor and/or a mulberry odor. The tubular device is composed of cardboard. The bait composition is capable of adhering to itself such that the bait composition is capable of remaining in place upon a hook while under water. The bait composition is configured into a strip.

A method of fabricating the fishing lure first requires the preparation of a bait composition. The preparation of the bait composition comprises the following steps: First, mixing an amount of powdered sugar, an amount of corn syrup, an amount of butter and an amount of water in a vessel to create a primary composition; second, heating the primary composition to a set temperature; third, cooling the primary composition; fourth, mixing an amount of gum paste, an amount of scent and an amount of colorant into the primary composition to create the bait composition; and last, applying the bait composition to a substrate to create the fishing lure. The heating step further comprises heating the primary composition at two hundred forty degrees Fahrenheit (240° F.) for ten minutes (10 min.) and the cooling step further comprises cooling the primary composition for ten minutes (10 min.)

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

- 10 rolled catfish bait
- 20 bait
- 22 gum paste
- 23 powdered sugar
- 24 corn syrup
- 25 butter
- 26 water
- 27 scent
- 28 color
- 50 wax paper
- 52 tube

DETAILED DESCRIPTION OF THE PREFERRED EMBODIMENT

Figure 1:
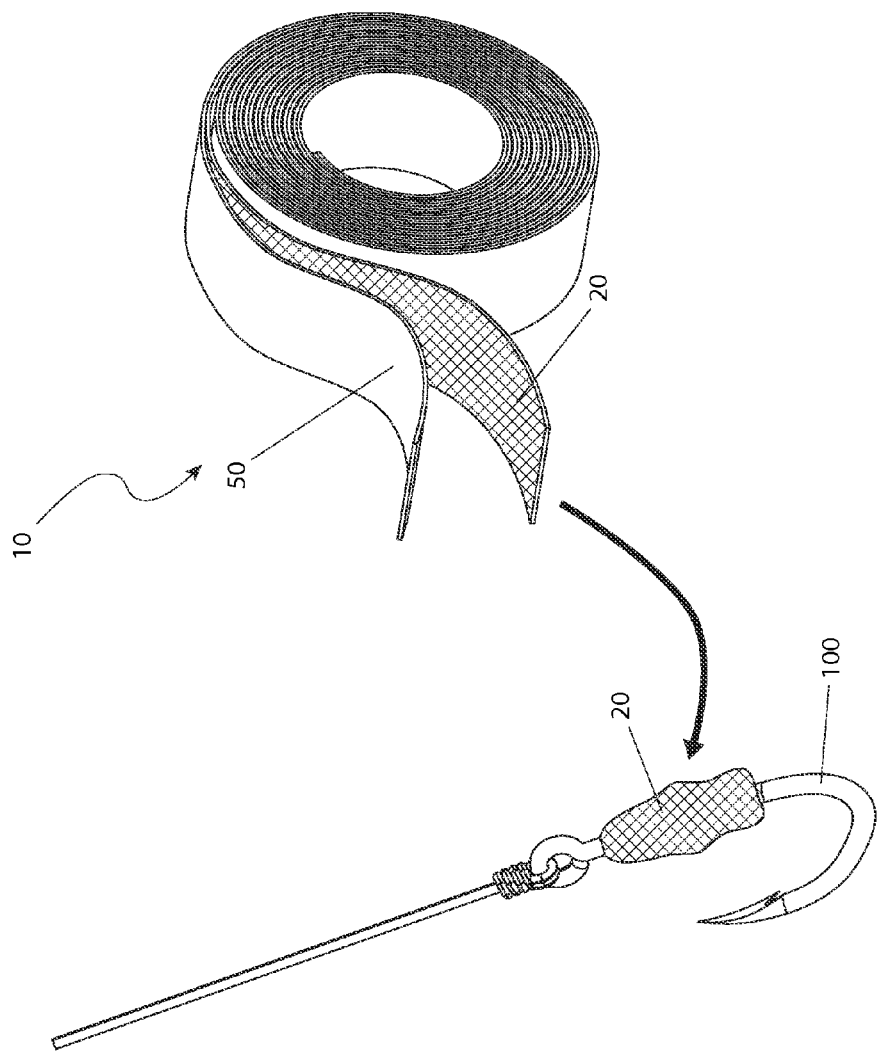
FIG. 1 is an environmental view of a rolled catfish bait 10 depicting an in-use state, according to a preferred embodiment of the present invention.
Figure 2:
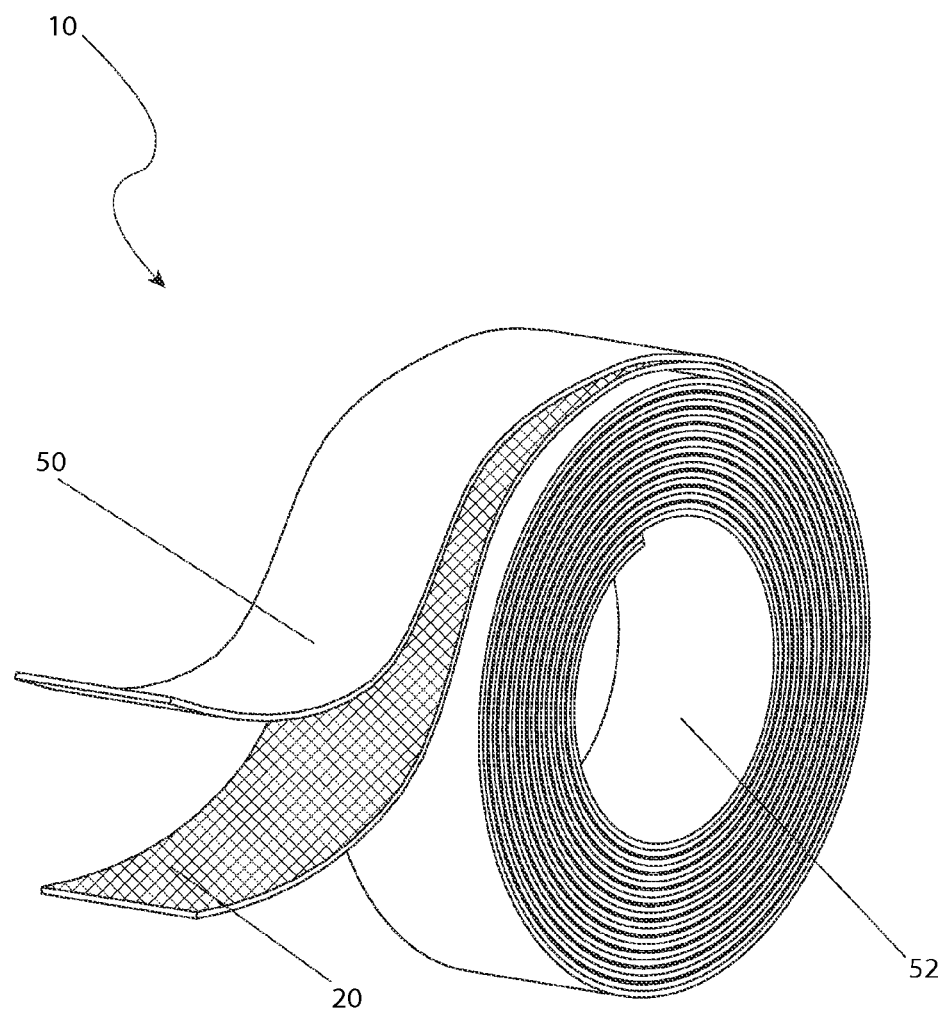
FIG. 2 is a perspective view of the rolled catfish bait 10, according to a preferred embodiment of the present invention; and, FIG. 3 is a process flow diagram of the rolled catfish bait 10, according to a preferred embodiment of the present invention.
Figure 3:
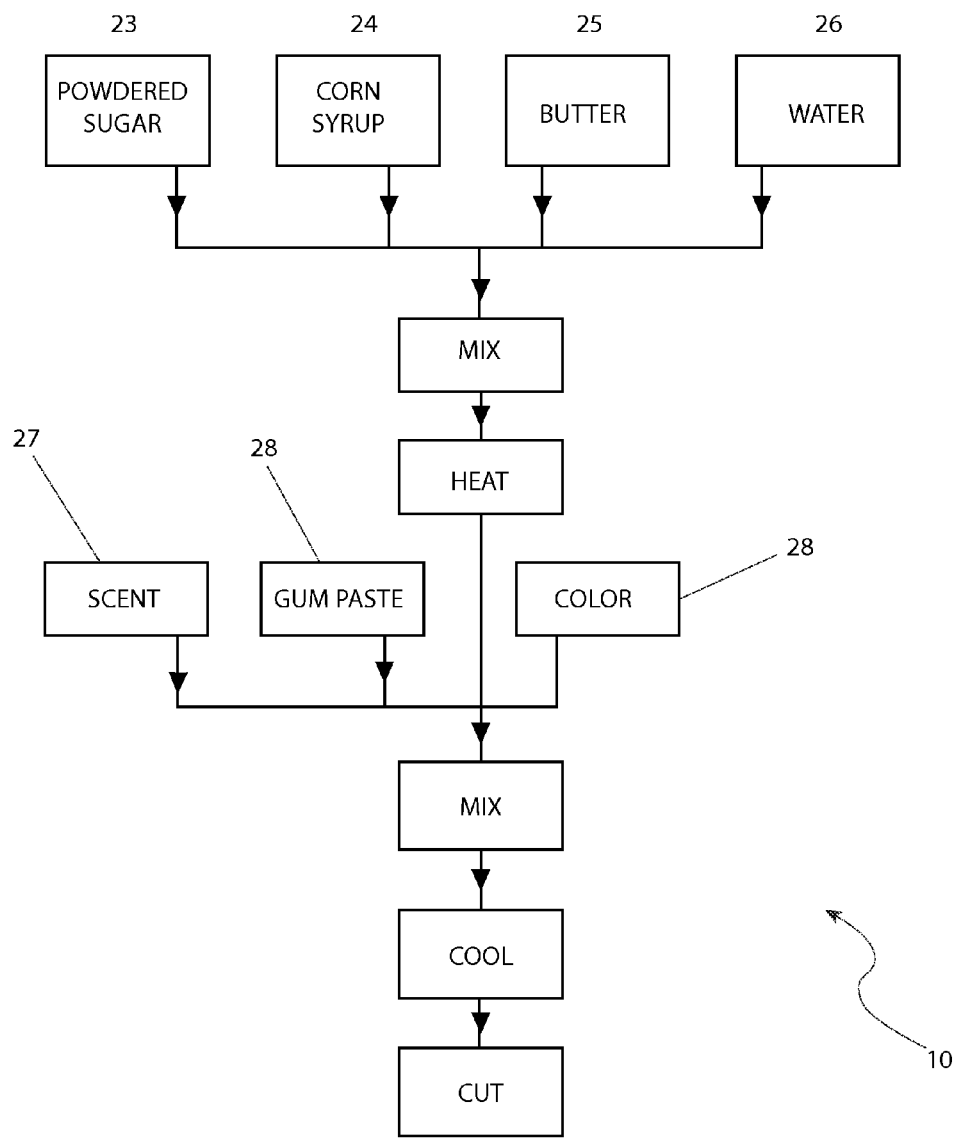

The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a rolled catfish bait (herein described as the "device") 10, which provides a fishing lure specifically designed to attract catfish; however, it is understood that the device 10 could be adapted for use with other types of fish as well, and as such should not be interpreted as a limiting factor of the device 10. The device 10 utilizes a taffy-like bait 20 that is applied to a fishing hook 100 to catch a fish. The formulation of the device 10 is listed below.

Referring now to FIG. 1, an environmental view of the device 10 depicting an in-use state, according to a preferred embodiment of the present invention, is disclosed. The device 10 comprises a bait 20, a paper or cardboard tube 52, and a separating layer of wax paper 50. The bait 20 is a taffy product containing various scents and attractants which dissolves slowly in water to attract a fish. The bait 20 would be provided in a strip format and wound upon a tube 52 for convenient dispensing. The user would simply feed off a section of the bait 20 and wrap the bait 20 around the hook 52 in a similar manner as a roll of tape. Due to the pliability of the bait 20, various shapes may be formed by the user such as, but not limited to: spherical, oval-shaped, or even emulating a shape of live bait such as a minnow. The bait 20 would adhere to itself and remain in place upon the hook 52, even when under water, and release an attracting scent 27 into the water to attract fish.

Referring now to FIG. 2, a perspective view of the device 10, according to a preferred embodiment of the present invention, is disclosed. The bait 20 would be provided in a strip format that is approximately one inch (1 in.) in width and one-sixteenth of an inch (1/16 in.) in thickness. A length of the bait 20 would be approximately five to ten feet (5-10 ft.) and wound upon a tube 52 for packaging and distribution in a sealed package. The bait 20 is wound upon the tube 52 having a layer of wax paper 50, or similar low-adhesion material, between layers of the bait 20 allowing the bait 20 to be easily dispensed.

The best mode for carrying out the invention is presented in terms of its preferred embodiment, herein described as the device 10 with a preferred formula listed below.

The bait portion 20 of the device 10 has an essential composition including gum paste 22, powdered sugar 23, corn syrup 24, butter 25, water 26, and scent 27.

The essential composition of the catfish bait 20 comprises the following composition:

| Component | Amount by volume |
| --- | --- |
| Gum paste (sugar paste) | 4½ tsp |
| Powdered Sugar | 1¼ cups |
| Clear Corn Syrup | ⅓ cup |
| Butter | 2 tsp |
| Water | ¼ cup |
| Scent (Anise) | 3 drops |
| Color (red) | 0.2 cc |

An alternate embodiment of the essential composition of the catfish bait 20 comprises substituting the Scent 27 (Anise) with a Mulberry extract.

Another alternate embodiment of the essential composition of the catfish bait 20 comprises substituting the Color 28 (red) with other colors such as, but not limited to: yellow, brown, white, cream, orange, gray, and purple.

A preferred embodiment of the essential composition is prepared by mixing the powdered sugar 23, corn syrup 24, butter 25, and water 26 together in a vessel over a heat source until the mixture begins to boil, placing the mixture onto a second heat source having a temperature of two-hundred forty degrees Fahrenheit (240° F.) for a period of eight minutes (8 min.), removing the mixture from the heat source and immediately mixing in the gum paste, scent 27, and color 28 portions, spreading and leveling the mixture over a flat non-stick surface to a thickness of one-sixteenth of an inch (1/16 in.) in thickness, allowing the formulation to cool, applying a sheet of wax paper 50 upon the entire surface of the bait 20, slicing the bait 20 and the wax paper 50 simultaneously into strips one inch (1 in.) in width, rolling up the strips of bait 20, being between five and ten feet (5-10 ft.) in length, onto tubes 52, and packaging the devices 10 in air-tight containers or bags to retard drying of the bait 20.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. The preparation and usage of the rolled catfish bait 10 may be achieved by performing the following steps: dispensing and cutting a section of the bait 20 in a similar manner to using a roll of tape; wrapping the section of bait 20 around the hook 52; manually shaping the bait 20 into a desired shape such as spherical, oval-shaped, or even forming a shape of a live bait item such as a minnow.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A fishing composition, comprising:
    a tubular device;
    a rolled bait composition wrapped around said tubular device; and,
    a strip of wax paper serving as a separating layer between the rolled bait layers;
    wherein said strip of wax paper removably covers an exposed surface of said bait composition,
    wherein said bait composition comprises gum paste, powdered sugar, corn syrup, butter, water, a scent, and a colorant.

2. The fishing composition of claim 1, wherein said bait composition comprises four and a half teaspoons of said gum paste, one and a quarter cups of said powdered sugar, a third cup of said corn syrup, two teaspoons of said butter, a quarter cup of said water, three drops of said scent, and two-tenths of a cubic centimeter of said colorant.

3. The fishing composition of claim 2, wherein said scent comprises an anise odor.

4. The fishing composition of claim 2, wherein said scent comprises a mulberry odor.

5. The fishing composition of claim 1, wherein said tubular device is composed of cardboard.

6. The fishing composition of claim 1, wherein said bait composition is capable of adhering to itself such that said bait composition is capable of remaining in place upon a hook while under water.

7. The fishing composition of claim 1, wherein said bait composition is configured into a strip.

8. A fishing composition, comprising:
  a tubular device;
  a rolled bait composition wrapped around said tubular device; and,
  a strip of wax paper serving as a separating layer between the rolled bait layers;
  wherein said strip of wax paper removably covers an exposed surface of said bait composition;
  wherein said bait composition comprises gum paste, powdered sugar, corn syrup, butter, water, a scent, and a colorant; and,
  wherein said bait composition is capable of being molded.

9. The fishing composition of claim 8, wherein said bait composition comprises four and a half teaspoons of said gum paste, one and a quarter cups of said powdered sugar, a third cup of said corn syrup, two teaspoons of said butter, a quarter cup of said water, three drops of said scent, and two-tenths of a cubic centimeter of said colorant.

10. The fishing composition of claim 9, wherein said scent comprises an anise odor.

11. The fishing composition of claim 9, wherein said scent comprises a mulberry odor.

12. The fishing composition of claim 8, wherein said tubular device is composed of cardboard.

13. The fishing composition of claim 8, wherein said bait composition is capable of adhering to itself such that said bait composition is capable of remaining in place upon a hook while under water.

14. The fishing composition of claim 8, wherein said bait composition is configured into a strip.

15. A method of fabricating a fishing composition, comprising the following steps: preparing a bait composition comprising the following steps:
  mixing an amount of powdered sugar, an amount of corn syrup, an amount of butter and an amount of water in a vessel to create a primary composition;
  heating said primary composition to a set temperature;
  cooling said primary composition; and,
  mixing an amount of gum paste, an amount of scent and an amount of colorant into said primary composition to create said bait composition;
  applying a sheet of wax paper upon the surface of the bait composition;
  forming a strip of wax paper and bait composition;
  rolling up the strip of bait and wax paper to form a composition where the strip of wax paper serves as a separating layer between the rolled bait layers.

16. The method of claim 15, wherein: said heating step comprises heating said primary composition at 240 degrees Fahrenheit for ten minutes and said cooling step comprises cooling said primary composition for ten minutes.

* * * * *